(12) United States Patent
Cheung et al.

(10) Patent No.: US 7,729,688 B2
(45) Date of Patent: Jun. 1, 2010

(54) SYSTEMS AND PROCESSES TO MANAGE MULTIPLE MODES OF COMMUNICATION

(75) Inventors: Kwok Wai Cheung, Tai Po (CN); Peter P. Tong, Mountain View, CA (US); C. Douglass Thomas, Campbell, CA (US)

(73) Assignee: IpVenture, Inc., Los Altos, CA (US)

( * ) Notice: Subject to any disclaimer, the term of this patent is extended or adjusted under 35 U.S.C. 154(b) by 643 days.

(21) Appl. No.: 11/452,115

(22) Filed: Jun. 12, 2006

(65) Prior Publication Data

US 2006/0259565 A1    Nov. 16, 2006

Related U.S. Application Data

(63) Continuation-in-part of application No. 11/006,343, filed on Dec. 7, 2004, now Pat. No. 7,116,976.

(60) Provisional application No. 60/527,565, filed on Dec. 8, 2003, provisional application No. 60/689,686, filed on Jun. 10, 2005.

(51) Int. Cl.
*H04M 3/00* (2006.01)
*H04Q 7/20* (2006.01)

(52) U.S. Cl. ............... 455/418; 455/435.3; 379/265.09

(58) Field of Classification Search ............... 709/206, 709/247, 227; 455/418, 435.3; 379/265.09, 379/88.18, 88.13, 88.22; 370/352
See application file for complete search history.

(56) References Cited

U.S. PATENT DOCUMENTS

| | | | |
|---|---|---|---|
| 5,548,636 A | 8/1996 | Bannister et al. | |
| 5,758,079 A | 5/1998 | Ludwig et al. | |
| 5,786,893 A | 7/1998 | Fink et al. | |
| 5,828,731 A | 10/1998 | Szlam et al. | |
| 5,930,700 A * | 7/1999 | Pepper et al. | 455/435.3 |
| 5,970,388 A | 10/1999 | Will | |
| 6,119,022 A | 9/2000 | Osborn et al. | |
| 6,463,462 B1 | 10/2002 | Smith et al. | |
| 6,577,859 B1 | 6/2003 | Zahavi et al. | |
| 6,636,888 B1 | 10/2003 | Bookspan et al. | |
| 6,665,534 B1 | 12/2003 | Conklin et al. | |
| 6,801,793 B1 | 10/2004 | Aarnio et al. | |
| 6,816,578 B1 | 11/2004 | Kredo et al. | |

(Continued)

FOREIGN PATENT DOCUMENTS

WO    WO 01/45243 A2    6/2001

OTHER PUBLICATIONS

U.S. Appl. No. 11/497,651, filed Aug. 2, 2006.

(Continued)

*Primary Examiner*—Charles N Appiah
*Assistant Examiner*—Kiet Doan

(57) ABSTRACT

A computer-implemented system and method to manage the communication of a user are disclosed. In one embodiment, when a person tries to electronically convey a message to the user, the status of the user, the identity of the person, and the urgency of the message can be identified. The access priority of the person can be determined based on the person's identity. Then, the message can be managed using one or more rules and in view of the status of the user, the access priority of the person and the urgency of the message.

18 Claims, 2 Drawing Sheets

| | |
|---|---|
| ContactClass1 | Kinship family members, love ones |
| ContactClass2 | Relatives and friends |
| ContactClass3 | Boss and VIP |
| ContactClass4 | Colleagues |
| ContactClass5 | Subordinates |
| ContactClass6 | Business acquaintances |
| ContactClass7 | VIP Clients |
| ContactClass8 | Clients |
| ContactClass9 | Secretary |
| ContactClass10 | User defined |

U.S. PATENT DOCUMENTS

| | | | |
|---|---|---|---|
| 6,819,757 B1* | 11/2004 | Cook et al. ............ | 379/265.09 |
| 8,816,578 | 11/2004 | Kredo et al. | |
| 6,978,136 B2 | 12/2005 | Jenniges et al. | |
| 7,010,288 B2 | 3/2006 | Brown et al. | |
| 7,010,332 B1 | 3/2006 | Irvin et al. | |
| 7,027,842 B2 | 4/2006 | Zhang et al. | |
| 7,043,261 B2 | 5/2006 | Krishnan | |
| 7,072,452 B1 | 7/2006 | Roberts et al. | |
| 7,085,253 B2 | 8/2006 | Yang | |
| 7,107,010 B2 | 9/2006 | Heinonen et al. | |
| 7,111,044 B2 | 9/2006 | Lee | |
| 7,116,976 B2 | 10/2006 | Thomas et al. | |
| 7,376,434 B2 | 5/2008 | Thomas et al. | |
| 2002/0067806 A1* | 6/2002 | Rodriguez et al. ....... | 379/88.12 |
| 2002/0094067 A1 | 7/2002 | August | |
| 2003/0041048 A1* | 2/2003 | Balasuriya ..................... | 707/1 |
| 2003/0103600 A1 | 6/2003 | Potter | |
| 2003/0129968 A1 | 7/2003 | Earl | |
| 2003/0232629 A1 | 12/2003 | Jang et al. | |
| 2004/0024882 A1* | 2/2004 | Austin et al. ................ | 709/227 |
| 2004/0122979 A1 | 6/2004 | Kirkland | |
| 2005/0037785 A1 | 2/2005 | Chen | |
| 2005/0071253 A1 | 3/2005 | Yang | |
| 2005/0191994 A1 | 9/2005 | May et al. | |
| 2005/0192061 A1 | 9/2005 | May et al. | |
| 2005/0273327 A1 | 12/2005 | Krishnan | |
| 2006/0288099 A1 | 12/2006 | Jefferson et al. | |
| 2007/0047522 A1 | 3/2007 | Jefferson et al. | |

OTHER PUBLICATIONS

PCT International Search Report and Written Opinion, Re: PCT/US 06/22015, Sep. 22, 2008.
"Company Overview", http://www.fastmobile.com/company_overview.html, downloaded Nov. 5, 2003, p. 1.
"Introducing the Tellme Voice Application Network", Tellme, http://www.tellme.com/products/, downloaded Oct. 2, 2003, p. 1.
"Iotum History," Iotum Corp., http://iotum.com/simplyrelevant/2006/04/03/iotum-history/, downloaded May 15, 2006, pp. 1-4.
"Messaging", Vodafone Group, 2001, http:www.vodafone.co.nz/business/10.2.3_messaging.jsp, downloaded Oct. 14, 2003, pp. 1-2.
"Microsoft Windows Messenger: Go Beyond Text with Voice & Video Chats", Dell Inc., http://www.dell.com/us/en/dhs/topics/segtopic_002_xp_im.htm, downloaded Oct. 2, 2003, pp. 1-2.
"Microsoft Windows Messenger: Instantly Communicate with Family and Friends Messenger", Dell Inc., http://www.dell.com/us/en/dhs/topics/segtopic_001_xp_im.htm, downloaded Oct. 2, 2003, pp. 1-3.
"Our Solution," Iotum Corp., http://www.iotum.com/our_solution.php, downloaded May 15, 2006, pp. 1-2.
Short Message Service/Interactive Voice Response (SMS/IVR), Lucent Technologies, 2003, pp. 1-2.
"Text messaging", Vodafone Group, 2001, Vodafone—Services, "All about text messaging", http://www.vodafone.co.nz/services/07.a.1_two_way_messaging.jsp?hd=4yourbusiness&..., downloaded Oct. 14, 2003, pp. 1-2.
"We bring relevance to communications," Cnet News, Ina Fried, Jul. 21, 2005, pp. 1-3.
Appenzeller, et al., "The Mobile People Architecture", Technical Report: CSL-TR-00000, Computer Systems Laboratory, Departments of Electrical Engineering and Computer Science, Stanford University, Jan. 1999, pp. 1-13.
BlackBerry, "Voice and SMS", http://www.blackberry.com/products/service/voices_sms.shtml?DCPID=hmsvoice downloaded Oct. 2, 2003, p. 1.
Calsyn, Martin and Desseault, Lisa, "Presence Information Protocol Requirements," Internet Draft, Feb. 9, 1998, pp. 1-27.
Emergin Inc., "Emergin WirelessOffice 5.0", http://www.emergin.com/?source=overture, downloaded Oct. 2, 2003, p. 1.
fastmobile Inc., "Dialog GSM launches Push 'n' Talk walkie talkie service Push to Talk over Cellular Now in Sri Lanka Dialog GSM Pioneers Latest GSM Advancement", Press Release, Dec. 1, 2004, pp. 1-2.
fastmobile, "fastmobile's fastchat™ Instant Communications Application is Coming to Thousands of Mobile Phone Retail Stores Nationwide", fastmobile Press Release, Sep. 15, 2003, pp. 1-3.
IMBOT, Press Release, "IMBOT offers new Text 2 Voice Service Text 2 Voice service enables wireless customers to send voice messages from 2-Way devices", Oct. 29, 2001, pp. 1-2.
Internet Traveler, "Welcome to the Inter.Net Communicator Tour!", http://www.inter.net/traveler/tour/communicator_messaging.php, downloaded Oct. 14, 2003, p. 1.
J. Rosenberg, H. Schulzrinne, Internet Draft, "SIP for Presence," http://www.alternic.org/drafts/drafts-r-s/draft-rosenberg=sip-pip-00.txt, Nov. 13, 1998, Bell Laboratories, Columbia, pp. 1-31.
Joseph, Anthony D. et al., "The Case for Services over Cascaded Networks", EECS Department, CS Division, University of California, Berkeley, http://iceberg.cs.berkeley.edu/, International Conference on Wireless and Mobile Multimedia 1998, pp. 1-9.
MobileShop, "SMS—also know as text messaging", http://www.mobileshop.org/howitworks.sms.htm, downloaded Oct. 14, 2003, pp. 1-2.
Schulzrinne, H. et al., RPID: Rich Presence Extensions to the Presence Information Data Format (PIDF), draft-ietf=simple-rpid-06.txt, Jun. 2, 2005, http://www1.ietf.org/mail-archive/web/simple/current/msg05398.html, downloaded Nov. 15, 2006, pp. 1-35.
Schulzrinne, H. et al., RPID: Rich Presence Extensions to the Presence Information Data Format (PIDF), draft-ietf-simple-rpid-10.txt, Dec. 20, 2005, pp. 1-41.
Sonim Technologies, Inc., "Integrated voice and text messaging over GPRS showcased jointly by Sonim, Symbian and Texas Instruments", Sonim Press Release, Dec. 2, 2002, pp. 1-2.
Symbian Ltd., "Symbian OS Version 7.0: Functional description", Revision 1.5, Feb. 2003, pp. 1-24.
Symbian Ltd., "Symbian OS Version 7.0s: Functional description", Revision 2.1, Jun. 2003, pp. 1-29.
Symbian Ltd., "Technology: Creating Symbian OS phones", http://www.symbian.com/technology/create-symb-OS-phones.html, downloaded Nov. 5, 2003, p. 1-8.
Symbian Ltd., "Technology: Why is a different operating system needed", http://www.symbian.com/technology/why-diff-os.html, downloaded Nov. 5, 2003, pp. 1-5.
Verizon Wireless, "TXT messaging", http://www.vtext.com/customer_site/jsp/messaging_lo.jsp, downloaded Oct. 2, 2003, p. 1.
W3C, Voice Extensible Markup Language (VoiceXML) Version 2.0, W3C, www.w3.org, Feb. 20, 2003.
Yahoo!Messenger, "Yahoo!Messenger Talk for Free!", http://messenger.yahoo.com/messenger/help/voicechat.html, downloaded Oct. 2, 2003, pp. 1-2.

* cited by examiner

| ICM | | Default |
|---|---|---|
| 1 | Mobile phone | Voice mail |
| 2 | Office phone | Voice mail |
| 3 | Home phone | Voice mail |
| 4 | Mobile SMS/pager from mobile phone or PDA | Email |
| 5 | Home/office SMS (to office/home PC) | Email |
| 6 | Mobile Online chat (to mobile phone or PDA) | Voice mail |
| 7 | Home Online chat (Net Meeting, AOL, ICQ etc.) | Voice mail |
| 8 | Voice mail with instant notification to mobile devices of the user | |
| 9 | Voice mail without notification to mobile devices | |
| 10 | Office fax | |
| 11 | Home fax | Reject |
| 12 | Mobile Email (Blackberry etc.) | Email |
| 13 | Email | Reject |
| 14 | User defined | |

FIGURE 1

| ContactClass1 | Kinship family members, love ones |
|---|---|
| ContactClass2 | Relatives and friends |
| ContactClass3 | Boss and VIP |
| ContactClass4 | Colleagues |
| ContactClass5 | Subordinates |
| ContactClass6 | Business acquaintances |
| ContactClass7 | VIP Clients |
| ContactClass8 | Clients |
| ContactClass9 | Secretary |
| ContactClass10 | User defined |

FIGURE 2

| UrgClass1 | Life threatening – interrupt at any time and occasion |
|---|---|
| UrgClass2 | Urgent confirmed meeting reminder – interruption allowed |
| UrgClass3 | Urgent matter requiring immediate attention |
| UrgClass4 | Important matter requiring quick attention |
| UrgClass5 | Regular work related matter |
| UrgClass6 | Casual contact |
| UrgClass7 | Cold calls from unknown person |
| UrgClass8 | User defined |

FIGURE 3

| MyBusyState1 | Important meeting |
|---|---|
| MyBusyState2 | Ordinary meeting |
| MyBusyState3 | Available |
| MyBusyState4 | Sleeping |
| MyBusyState5 | Resting |
| MyBusyState6 | User defined |

FIGURE 4

| ContactClass | UrgClass | MyBusyState | ICM allowed |
|---|---|---|---|
| ContactClass2 | UrgClass1-3 | All | All |
| | UrgClass4-6 | MyBusyState1 | All |
| | | MyBusyState2-3 | All |
| | | MyBusyState4-5 | All |
| | UrgClass7-8 | All | ICM 13 |

FIGURE 5

SYSTEMS AND PROCESSES TO MANAGE MULTIPLE MODES OF COMMUNICATION

CROSS-REFERENCE TO RELATED APPLICATION

This application is a continuation-in-pad application of U.S. patent application Ser. No. 11/006,343, filed Dec. 7, 2004, now U.S. Pat. No. 7,116,976, and entitled "ADAPTABLE COMMUNICATION TECHNIQUES FOR ELECTRONIC DEVICES," which is hereby incorporated herein by reference, which claims priority to U.S. Provisional Patent Application No. 60/527,565, filed Dec. 8, 2003, entitled "ADAPTABLE COMMUNICATION TECHNIQUES FOR ELECTRONIC DEVICES," and which is hereby incorporated herein by reference.

This application also claims priority to U.S. Provisional Patent Application No. 60/689,686, filed Jun. 10, 2005, entitled "SYSTEMS AND PROCESSES TO MANAGE MULTIPLE MODES OF COMMUNICATION," and which is hereby incorporated herein by reference.

BACKGROUND OF THE INVENTION

For many years, other than mails from post offices, we typically only received information from afar through telephones. However, in the past few years, ways that others can send us information have increased significantly. Just to list a few different modes of communication, we can be reached from standard desk phones, fax, cell phones, electronic mails, and instant messages. In addition, we can have more than one phone number and multiple electronic mail addresses. There are people we like to communicate with, and there are those we prefer to avoid. Managing information from all such different modes can be quite time consuming.

It should be apparent from the foregoing that there is still a need to help manage the numerous modes of communication.

SUMMARY OF THE INVENTION

Different embodiments of a computer-implemented system and method to manage the communication of a user are disclosed. A person tries to electronically convey a message to the user. In one embodiment, the status of the user is identified; the identity of the person is identified; the urgency of the message is identified; the access priority of the person is determined based on the person's identity; and a process is set to manage the message using one or more rules, and in view of the status of the user, the access priority of the person and the urgency of the message.

Based on different embodiments, the status of the user depends on the current activity or location of the user, or the current time. The status of the user can also be defined by the user. Similarly, the access priority of the person can be defined by the user, or is set depending on the user's reaction towards a prior message from the person. Also, the urgency of the message is set by the person.

The process can depend on the mode of communication of the message. For example, the mode of communication can include a mobile phone, an office phone, a home phone, a mobile SMS, a pager from a mobile phone or PDA, a home/office SMS, mobile online chat, home online chat, a voice mail with/without instant notification, an office fax, a home fax, a mobile email, and an email.

In one embodiment, the user receives the message through a handheld device, such as a cellular phone. In another embodiment, the message is electronically conveyed based on Internet protocol through a website.

In one embodiment, though the process allows the user to receive the message, the person is not aware of the contact information of the user. For example, the person is not aware of the phone number of the cellular phone that the user used to talk to the person. This prevents the person from directly accessing the user without going through an intermediate control, such as a website. Similarly, the user does not have to be aware of the contact information of the person.

In another embodiment, the defined access priority of the person is stored at a website, allowing the website to access such information without asking for the user's permission. In one embodiment, the defined access priority is stored in a private database under the user's control.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 1 shows a number of intelligent communication modes according to one embodiment of the invention.

FIG. 2 shows a number of contact classes according to one embodiment of the invention.

FIG. 3 shows a number of urgency classes according to one embodiment of the invention.

FIG. 4 shows a number of statuses of a user according to one embodiment of the invention.

FIG. 5 shows one embodiment of an example of an Access Priority Database according to one embodiment of the invention.

Same numerals in FIGS. 1-5 are assigned to similar elements in all the figures. Embodiments of the invention are discussed below with reference to FIGS. 1-5. However, those skilled in the art will readily appreciate that the detailed description given herein with respect to these figures is for explanatory purposes as the invention extends beyond these limited embodiments.

DETAILED DESCRIPTION OF THE INVENTION

One embodiment of the invention can automatically remove unwanted communications. Certain communications are relatively easy to determine to be unwanted, such as marketing cold calls and wrong number calls. Other communications may be more difficult. They can depend not just on the sources of the communication, but also the conditions or status of the receiver (a user) of the communication. The status can be related to the user's current activity and/or location. For example, when the user is on a train going to work, the user probably does not mind chatting with his grandchild. However, if the user is having his yearly review meeting with his boss, the user probably would prefer to avoid the call from his grandchild, unless it is an emergency. Based on the embodiment, communications from sources the user wants to postpone receiving can be automatically diverted.

In one embodiment, the user can get appropriate notification on the source of the incoming communication request. The attributes of the notification can depend on the urgency of the communication and/or the status of the user.

The user may receive information from different modes of communication. For example, the user can have mobile phones, fixed lines at home or office, emails, SMS, and faxes, with their different numbers and/or addresses. One embodiment can help the user efficiently manage information from the different modes. The user only has to remember one specific address from one mode of communication. Through that address, the user can receive communications from all modes of communication, independent of where the user is, or the type of hardware the user has. This allows the user to efficiently maintain his communication from the numerous modes even when he is traveling. For example, the user does not have to change phones (and the phone numbers) when he moves from areas covering 3G to areas that do not.

A number of embodiments depend on the different modes of communication converging onto the internet protocol platform. A communication gateway or a portal is formed allowing the user to receive communications from numerous sources through different modes. This, in turn, could reduce the numerous addresses the user has to remember, to one address. For example, an e-mail address for the user can serve as an access identifier for the different communication addresses from different communication modes. The access identifier can become the user's digital identity. In one embodiment, the user's other types of identification, such as the user's driver licenser number, can be the user's access identifier.

One embodiment of the invention uses an open portal based on the web. Based on the portal, the user can securely determine who can reach him at what conditions. This can be done based on a status indicator. As an example, this indicator is determined according to the status of the user, the access priorities of the person trying to reach the user (or the relationship or the lack of relationship between the user and the person), and/or the urgency of the message from the person. The status of the user can be dynamically determined, based on the current condition(s) of the user. The portal can allow the user and the person to select different options, which can be modified as desired. For example, the relationship can be preset by the user and stored in a database, while the urgency of the message can be set by the person.

Thus, in one embodiment, the portal can be used to control the selection and setting of different intelligent communication modes for the user. These intelligent communication modes allow priorities of various kinds of communication options to be set by the user. The portal allows worldwide access to the user, and can dynamically determine, for example, whether a call initiated at different time by different callers should be accepted by the user in real-time or handled by other mechanisms. From this information, communication requests can be classified, for example, into different degrees of undesirability. Some requests can be automatically blocked from the user. Others can be diverted and handled by other mechanism, such as diverting a phone call to an email or voice mail.

In one embodiment, the portal or gateway also includes a database to keep track of the user's different contacts or acquaintances, and the access priorities of each contact. The user can modify information in the database, such as assigning and/or changing the priorities of the contacts. Based on the information (or lack of information) in the database of the contact trying to access the user, and based on the status of the user, the gateway can automatically select an intelligent mode of communication for the user. This selection can be done dynamically.

In one embodiment, the portal can dynamically change the access priorities of a caller trying to reach the user. For example, previously the caller is of high priority to the user, and the user has set her access priorities accordingly. Lately, every time the caller trying to reach the user, the request was denied. After a preset number of rejections, the portal can automatically send a message to the user, asking the user if the user would like to lower the access priority of the caller. If the response is affirmative, the caller's priority is automatically reduced.

In another embodiment, the user does not have to set priorities of each contact. The system monitors every call, and provides the contact's identity to the user. Based on the user's reaction to the call (e.g. accepting or rejecting it), the system automatically sets the contact's priorities. In one embodiment, the system can then query the user for approval on the setting, and allow the user to adjust it as necessary. In another embodiment, the system can continue to modify the caller's priorities based on the user's reaction to the caller's subsequent calls.

In one embodiment, the user could keep information he believes to be sensitive local in a different database. Such information can be stored securely under the user's direct control. The portal can retrieve information from the different database when required. In another embodiment, the user can restrict or limit such retrieval process.

Additional confidentiality can be provided. In one embodiment, using phone calls as an example, the user can be aware of the identity of the caller even without being informed of the number of the caller. Similarly, the caller can reach the user without being aware of the number of the phone the user is using to receive the call. The user can keep his location and/or status confidential but still can receive the communication. This can be useful because there are situations, for example, when the user does not want to disclose his contact information but the user needs to receive services provided by the caller.

One approach to maintain such confidentiality while maintaining real-time communication is based on a system that digitally identifies the identities of the caller and the receiver. Note that the term caller is used in general. It is not just limited to phone calls, but they can be any person or entity requesting to communicate with the user, such as trying to send a message to the user. As a separate note, the caller can also be a user of different embodiments of the invention.

After determining the identities, the system can establish connections between the caller and the user in real time. Though contacts are established, the system only needs to ensure the identities of the caller and the user to each other. However, the system does not have to disclose the phone numbers, electronic addresses, physical locations and/or other attributes of the caller and the user to each other. In one embodiment, real time implies that the time required for the identification is similar to the typical time required to set up, for example, a telephone call. The system can be a portal based on the web.

In one embodiment, a portal also holds the user's electronic calendar. The calendar can be programmable, with entries set by the user. The portal can automatically and securely set appointments for the user since the portal knows the identity of the caller, and the status and schedule of the user. For example, the appointment can be for a conference call.

To illustrate, in one embodiment, a portal provides a number of intelligent communication modes (ICM) for the user to select as shown in FIG. 1. There are three columns in the table. If the communication mode selected in the second column does not work, the portal automatically defaults to the corresponding approach in the third column. For example, under ICM 1, if the mobile phone is busy, default to voice mail. Some of the selections do not have any default because it may not be necessary to default. For example, under ICM 8, the incoming message goes directly to voice mail with instant notification to mobile devices of the user. The incoming message can usually go to voice mail. There is no need to default.

As a receiver of communication, the user can define a number of contact classes, as shown in FIG. 2. The user can set up a number of urgency classes, as shown in FIG. 3. The user can define a number of status, as shown in FIG. 4. Then, based on tables in FIGS. 1-4, the user can set up an Access Priority Database for different ContactClasses, as shown in FIG. 5.

As another example, the user can categorize the following contacts into the corresponding ContactClasses:

| | |
|---|---|
| Alice (Wife) | ContactClass1 |
| Peter (Close Friend) | ContactClass2 |
| Colina (Close Friend's wife) | ContactClass2 |

Peter wants to make a mobile phone call to the user. In one embodiment, Peter calls a portal. As an example, the portal can be the user's ISP. The portal first verifies the caller's identity to be Peter. This can be done, for example, by a public key challenge based on Peter having a public key digital certificate. In another example, Peter is also a registered user of the portal. Then, Peter's identity can be more readily identified or verified.

In one embodiment, after verification, a virtual address/number for the communication session is created allowing Peter to reach the user, which can be by phone. The user's phone number does not have to be disclosed to Peter. Similarly, Peter's mobile phone number does not have to be disclosed to the user. The portal can assure the user that the person calling is Peter based on an identification verification process, such as ones described above.

In establishing contact, the portal can access the user's database and determine that Peter belongs to ContactClass2. The database can, for example, be in the portal.

In another embodiment, the database is in a personal communication device of the user. The portal accesses the personal communication device to determine Peter's ContactClass.

Based on the ContactClass information, the status of the user and Peter's urgency setting, the user may receive Peter's call directly. As another example, Peter may be asked to leave a voice mail to the user, while the user is notified by a mobile short message regarding an incoming call from Peter.

As additional examples, in one embodiment, location information of the user could be determined based on GPS information from, for example, the user's cell phone.

In one embodiment, the user receives messages through a handheld device, such as a phone, and the phone has a switch. The switch can be a physical button or a software setting, such as a pull-down menu. The user could set his status dynamically by changing the physical or logical position of the switch. For example, one position can indicate that the user is very busy, and should only be interrupted by an urgent message from the user's closest contacts, such as his wife or parents. Another position can indicate that the user's status allows the user to receive any messages from anyone.

As explained above, based on an embodiment, a message is electronically conveyed by a central network server, such as a web server based on Internet protocol. A portal or gateway approach could provide general Internet access to one or more embodiments of the communication management systems so that users can configure the system behavior they desire. The portal or gateway can then facilitate download of a database or update thereto to a communication device, such as a phone.

Also, as explained above, based on an embodiment, a user could efficiently maintain his communication, and does not even have to change phones when he moves from areas covering 3G to areas that do not. These phones could be based on different communication mechanisms, such as GSM, CDMA, 3G and 4G systems. Also as explained above, the user could keep information in local databases, such as in such a phone. For example, the intelligent communication modes shown in FIG. 1 for the user to select are in the phone. The user could define the contact classes, such as the ones shown in FIG. 2; set up the urgency classes, such as the ones shown in FIG. 3; define the statuses, such as the ones shown in FIG. 4; set up the Access Priority Database, such as the one shown in FIG. 5; and categorize a number of the user's contacts into the corresponding ContactClasses, all in the phone. When a caller places a call to the phone, based on information previously set in the phone and based on the urgency class selected by the caller, the phone could automatically manage the communication. Note that the phone does not have to be a cellular phone. In one embodiment, the phone is a desk top phone.

Again as explained above, the person or the caller trying to contact the user could select different options. For example, the urgency of the message can be set by the caller. This selection is typically in the call setup phase. In one embodiment, the caller has pre-selected the urgency class before making the call. In another embodiment, if the caller has not selected the urgency class, the system could prompt the caller to input an urgency class or status before the call or message is routed to the user. In yet another embodiment, different urgency classes could be defined by the caller.

Further, the computer-implemented methods and systems discussed above can be used in conjunction with one or more of the various approaches discussed in U.S. patent application Ser. No. 11/006,343. For example, the automated actions or decisions (e.g., intelligent secretary, decision 204 in FIG. 2, etc.) of U.S. patent application Ser. No. 11/006,343 can be automatically made by the systems/methods described above. Still further, the various approaches discussed in U.S. patent application Ser. No. 11/006,343 can be used in conjunction with one or more the various methods/systems discussed above. For example, the systems/methods described above can use the messaging approaches (e.g., audio or textual messages) described in U.S. patent application Ser. No. 11/006,343.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer readable storage medium encoded with instructions capable to be executed by a computing device to manage the communication of a user in view of a caller trying to electronically convey a message to the user, the plurality of instructions, when executed by the computing device, result in the computing device:

receiving, by a network-based portal, the message;
identifying, by the network-based portal, the identity of the caller based on identifying a digital identity of the caller;
identifying, by the network-based portal the urgency of the message;
requesting, by the network-based portal, information from at least a storage device, to determine an access priority of the caller based on the caller's identity, and to determine a status of the user; and managing, by the network-based portal, the message using one or more rules, and in view of the status of the user, the access priority of the caller and the urgency of the message, wherein the access priority of the caller is selected from a plurality of levels and is pre-stored in the storage device, wherein the user can restrict the network-based portal from getting the information from the storage device, wherein the storage device is in a personal communication apparatus of the user, wherein though the plurality of instructions, when executed by a computing device, further result in the computing device allowing the user to receive the message, the caller is not aware of the contact information of the user to prevent the caller from directly sending messages to the personal communication apparatus of the user without going through the network-based portal, and wherein though the plurality of instructions, when executed by a computing device, further result in the computing device allowing the user to receive the message, the user is not aware of contact information of the caller to prevent the user from directly sending messages to the caller without going through the network-based portal.

2. A computer readable storage medium as recited in claim 1, wherein the network-based portion includes at least one server.

3. A computer readable storage medium as recited in claim 1, wherein the access priority of the caller is selected by the user.

4. A computer readable storage medium as recited in claim 1, wherein the access priority of the caller depends on the user's prior reaction towards at least one prior message from the caller.

5. A computer readable storage medium as recited in claim 4, wherein the plurality of instructions, when executed by a computing device, further result in the computing device:

asking the user if the user desires to set the access priority of the caller to a certain level based on the user's prior reaction towards the caller; and setting the access priority of the caller to the certain level upon an affirmative response from the user.

6. A computer readable storage medium as recited in claim 1, wherein the user receives the message through the personal communication apparatus, and wherein the status of the user is defined by the user using the personal communication apparatus.

7. A computer readable storage medium as recited in claim 1, wherein the portal accesses an electronic calendar of the user, and wherein an appointment is automatically set for the user with the caller, in view of information in the calendar.

8. A computer readable storage medium as recited in claim 1, wherein the plurality of instructions, when executed by a computing device, further result in the computing device verifying the identity of the caller based on the caller's public key digital certificate.

9. A computer readable storage medium as recited in claim 1, wherein the personal communication apparatus is a cellular phone.

10. A personal communication apparatus of a user comprising:

at least a storage device including information regarding a status of the user and an access priority of a caller, wherein the access priority of the caller is selected from a plurality of levels and is pre-stored in the storage device, with the caller trying to electronically convey a message to the user by sending the message to a network-based portal, which is configured to identify the identity of the caller and the urgency of the message;

a switch with a plurality of levels, with the switch configured to allow the user to change the status by selecting a level; and at least a wireless mechanism being configured to receive a request from the network-based portal for the information regarding the status of the user and the access priority of the caller based on the caller's identity, and being configured to send a response to the network-based portal regarding the information, wherein the network-based portal is configured to determine if the message should be transmitted to the personal communication apparatus based on one or more rules, the status of the user, the access priority of the person caller and the urgency of the message, wherein though the user can receive the message via the communication apparatus, the caller is not aware of the contact information of the user to prevent the caller from directly sending messages to the personal communication apparatus without going through the network-based portal, wherein though the user can receive the message via the communication apparatus, the user is not aware of the contact information of the caller to prevent the user from directly sending messages to the caller without acing through the network-based portal, and wherein the apparatus is configured to allow the user to restrict the network-based portal from getting the information from the storage device.

11. A personal communication apparatus as recited in claim 10, wherein the access priority of the caller depends on the user's prior reaction towards at least one prior message from the caller.

12. A personal communication apparatus as recited in claim 11, wherein the communication apparatus is configured to ask the user if the user desires to set the access priority of the caller to a certain level based on the user's prior reaction towards the caller, and wherein the communication apparatus is configured to set the access priority of the caller to the certain level upon an affirmative response from the user.

13. A personal communication apparatus as recited in claim 10, wherein the portal accesses an electronic calendar of the user, and wherein an appointment is automatically set for the user with the caller, in view of information in the calendar.

14. A personal communication apparatus as recited in claim 10, wherein the identity of the caller is verified based on the caller's public key digital certificate.

15. A personal communication apparatus as recited in claim 10, wherein the personal communication apparatus is a cellular phone.

16. A personal communication apparatus as recited in claim 10, wherein the network-based portal includes at least one server.

17. A computer readable storage medium encoded with instructions capable to be executed by a computing device to manage the communication of a user in view of a caller trying to electronically convey a message to the user, the plurality of instructions, when executed by the computing device, result in the computing device:

receiving, by a network-based portal, the message;

identifying, by the network-based portal, the identity of the caller based on identifying a digital identity of the caller, the urgency of the message, an access priority of the caller based on the caller's identity, and a status of the user; and managing, by the network-based portal, the message using one or more rules, and in view of the status of the user, the access priority of the caller and the urgency of the message, wherein the access priority of the caller depends on the user's prior reaction towards at least one prior message from the caller, wherein though the plurality of instructions, when executed by a computing device, further result in the computing device allowing the user to receive the message, the caller is not aware of the contact information of the user to prevent the caller from directly sending messages to the user without going through the network-based portal, and wherein though the plurality of instructions, when executed by a computing device, further result in the computing device allowing the user to receive the message, the user is not aware of contact information of the caller to prevent the user from directly sending messages to the caller without going through the network-based portal.

18. A computer readable storage medium as recited in claim 17, wherein the plurality of instructions, when executed by a computing device, further result in the computing device:

asking the user if the user desires to set the access priority of the caller to a certain level based on the user's prior reaction towards the caller; and setting the access priority of the caller to the certain level upon an affirmative response from the user.

* * * * *

UNITED STATES PATENT AND TRADEMARK OFFICE
CERTIFICATE OF CORRECTION

PATENT NO. : 7,729,688 B2
APPLICATION NO. : 11/452115
DATED : June 1, 2010
INVENTOR(S) : Cheung et al.

Page 1 of 1

It is certified that error appears in the above-identified patent and that said Letters Patent is hereby corrected as shown below:

Item (56) References Cited:
On Page 2, under U.S. Patent Documents

"8,816,578   11/2004   Kredo et al." should be --6,816,578   11/2004   Kredo et al.--.

In Column 1, line 7 "continuation-in-pad" should be --continuation-in-part--.

In the Claims:

Column 8, line 20 (claim 10, line 24) "person caller" should be --caller--.

Column 8, line 31 (claim 10, line 34) "acing" should be --going--.

Signed and Sealed this
Eighth Day of February, 2011

David J. Kappos
*Director of the United States Patent and Trademark Office*